(12) United States Patent
Barbee et al.

(10) Patent No.: US 6,653,388 B1
(45) Date of Patent: *Nov. 25, 2003

(54) POLYMER/CLAY NANOCOMPOSITE COMPRISING A CLAY MIXTURE AND A PROCESS FOR MAKING SAME

(75) Inventors: Robert Boyd Barbee, Kingsport, TN (US); John Walker Gilmer, Kingsport, TN (US); James Christopher Matayabas, Jr., Chandler, AZ (US); Tie Lan, Lake Zurich, IL (US); Vasiliki Psihogios, Palatine, IL (US)

(73) Assignee: University of South Carolina Research Foundation, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,318

(22) Filed: Dec. 1, 1999

Related U.S. Application Data

(60) Provisional application No. 60/111,074, filed on Dec. 7, 1998.

(51) Int. Cl.$^7$ ................................................ C08K 3/34
(52) U.S. Cl. ........................................ 524/445; 524/186
(58) Field of Search ............................... 428/333, 338, 428/339; 523/210; 524/445, 446, 447; 501/148

(56) References Cited

U.S. PATENT DOCUMENTS 2,531,427 A   11/1950   Hauser
2,737,517 A   3/1956    Boyd (List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 0822163 | 2/1998 |
| EP | 0846723 | 6/1998 |
| EP | 846723 | 6/1998 |
| EP | 0 899 301 A1 | 3/1999 |
| EP | 0 909 787 A1 | 4/1999 |
| EP | 0909787 | 4/1999 |
| EP | 940430 | 9/1999 |
| GB | 1090036 | 11/1967 |
| GB | 2123014 | 1/1984 |
| JP | 758001156 | 1/1975 |
| JP | 75005735 | 3/1975 |
| JP | 75005751 | 3/1975 |
| JP | 750101969 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/41299 | 8/1999 |
| WO | WO 0034378 | 6/2000 |
| WO | WO 0034393 | 6/2000 |

OTHER PUBLICATIONS

Verbicky, *Encyclopedia of Polymer Science and Engineering*, 2nd Edition, 12, 364–383 (1988).
MSDS—Polyvinyl Alcohol.
MSDS—Clay (Montmorillonite).
*Encyclopedia of Polymer Science and Engineering*, 2nd Edition, 12, 364–383 (1988).

(List continued on next page.)

*Primary Examiner*—Edward J. Cain
*Assistant Examiner*—Katarzyna Wyrozebski
(74) *Attorney, Agent, or Firm*—Troutman Sanders LLP; Michael S. Kerns, Esq.; Jacqueline Haley, Esq.

(57) ABSTRACT

This invention relates to a polymer-clay nanocomposite comprising (i) a melt-processible matrix polymer, and incorporated therein (ii) a mixture of at least two layered clay materials. The invention also relates to articles produced from a nanocomposite and a process for preparing a nanocomposite.

39 Claims, No Drawings

U.S. PATENT DOCUMENTS

| | | |
|---|---|---|
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel et al. |
| 3,876,552 A | 4/1975 | Moynihan |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaira et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kuhner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. |
| 5,414,042 A | 5/1995 | Yasue et al. |
| 5,429,999 A | 7/1995 | Naé et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A | 9/1996 | Beall et al. |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tipursky et al. |
| 5,882,751 A | 3/1999 | Occhiello et al. |
| 5,942,320 A | 8/1999 | Miyake et al. |
| 5,952,093 A * | 9/1999 | Nichols et al. ............. 428/323 |
| 5,993,769 A * | 11/1999 | Pinnavaia et al. ........... 423/331 |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A * | 6/2000 | Barbee et al. ............. 523/210 |
| 6,084,019 A * | 7/2000 | Matayabas, Jr. et al. .... 524/445 |
| 6,117,541 A | 9/2000 | Frisk |
| 6,120,860 A | 9/2000 | Bowen et al. |
| 6,162,857 A | 12/2000 | Trexler et al. |
| 6,232,388 B1 | 5/2001 | Lan et al. |
| 6,391,449 B1 * | 5/2002 | Lan et al. .................... 428/402 |

OTHER PUBLICATIONS

LeBaron et al., "Polymer–layered silicate nanocomposites: an overview," *App. Clay Sci.*, 15, 11–29 (1999).

Ke et al., "Crystallization, Properties, and Crystal and Nanoscale Morphology of PET–Clay Nanocomposites," *J. Appl. Polym. Sci.*, 71, 1139–1146 (1999).

Kawasumi et al., "Preparation and Mechanical Properties of Polypropylene–Clay Hybrids," *Macromolecules*, 30, 6333–6338 (1997).

Usuki et al., "Synthesis of Propylene–Clay Hybrid", *J. Appl. Polym. Sci.*, 63, 137–139 (1997).

Giannelis, "Polymer Layered Silicate Nanocomposites," *Advanced Materials*, 8, 29–35 (1996).

Kurokawa et al., "Preparation of nanocomposite of polypropylene and smectite," *J. Materials Science Letters*, 15, 1481–1483 (1996).

Oriakhi et al., "Incorporation of poly(acrylic acid), poly(vinylsulfonate) and poly(styrenesulfonate) within layered double hydroxides," *J. Mater. Chem.*, 6, 103–107 (1996).

Messersmith et al., "Syntheses and Barrier Properties of Poly($\epsilon$-Caprolactone)–Layered Silicate Nanocomposites," *J. of Polym. Sci.*, 33, 1047–1057 (1995).

Pinnavaia et al., "Clay–Reinforced Epoxy Nanocomposites," *Chem. Mater.*, 6, 2216–2219 (1994).

Sugahara et al., "Clay–Organic Nano–Composite; Preparation of a Kaolnite—Poly(vinylpyrrolidone) intercalation Compound," *J. Ceramic Society of Japan*, 100, 413–416 (1992).

Yano et al., "Synthesis and polymide–clay hybrid," *ACS, Polymer Preprints*, 32, 65–66, (1991).

Fukushima et al., "Swelling Behavior of Montmorillonite by Poly–6–Amide," *Clay Minerals*, 23, 27–34 (1988).

Fukushima et al., "Synthesis of an Intercalated Compound of Montmorillonite and 6–Polyamide," *J. Inclusion Phenomena*, 5, 473–482 (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

Greenland, "Adsorption of Polyvinyl Alcohols by Montmorillonite," *J. Colloid Sci.*, 18, 647–664 (1963).

* cited by examiner

POLYMER/CLAY NANOCOMPOSITE COMPRISING A CLAY MIXTURE AND A PROCESS FOR MAKING SAME

RELATED APPLICATION

This application claims priority to U.S. provisional patent application Serial No. 60/111,074, filed Dec. 7, 1998, which is incorporated herein by this reference in its entirety.

FIELD OF THE INVENTION

This invention relates generally to a polymer-clay nanocomposite comprising a mixture of clay materials. This invention further relates to articles produced from a nanocomposite, and a process for preparing a nanocomposite.

BACKGROUND OF THE INVENTION

There is much interest in layered, clay-based polymer nanocomposites because of the improved properties exhibited by the nanocomposites. It is desirable to maximize delamination of the clay into individual platelet particles in order to maximize some property improvements, including barrier improvements, and to minimize deleterious effects on some properties including elongation-at-break. Ideally, the clay is exfoliated into particles with size less than about 100 nm in order to achieve clarity that is comparable to the clay-free polymer. To date, the only polymer/clay nanocomposites that meet this expectation are prepared by incorporation of organically treated clays during synthesis of the polymer from monomer.

It is also widely known that the amount of clay that can be admixed in a polymer and still exhibit exfoliation of the layered clay is limited and some mechanical properties, such as elongation-at-break, are often reduced considerably upon the addition of the clay. Researchers recognized the value of inventing melt compounding processes that provide exfoliated polymer/platelet particle composites, namely more versatility of polymer choice and clay loading, and the potential for cost savings. However, with polymer/clay mixtures, the melt compounding processes explored to date do not provide sufficient exfoliation of the platelet particles.

Polyesters such as poly(ethylene terephthalate) (PET) are widely used in bottles and containers which are used for carbonated beverages, fruit juices, and certain foods. Useful polyesters have high molecular weight values (high inherent viscosities (I.V.s)) as determined by solution viscometry, which allow polyesters to be formed into parisons and subsequently molded into containers. Because of the limited barrier properties with regard to oxygen, carbon dioxide and the like, PET containers are not generally used for products requiring long shelf life. For example, oxygen transmission into PET bottles which contain beer, wine and certain food products causes these products to spoil. There have been attempts to improve the barrier properties of PET containers by the use of multilayer structures comprising one or more barrier layers and one or more structural layers of PET. However, multilayer structures have not found wide use and are not suitable for use as a container for beer due to the high cost, the large thickness of the barrier layer required and poor adhesion of the barrier layer with the structural layer.

There are many examples in the patent literature of polymer/clay nanocomposites prepared from monomers and treated clays. For example, U.S. Pat. No. 4,739,007 discloses the preparation of Nylon-6/clay nanocomposites from caprolactam and alkyl ammonium-treated montmorillonite. U.S. Pat. No. 4,889,885 describes the polymerization of various vinyl monomers such as methyl methacrylate and isoprene in the presence of sodium montmorillonite.

Some patents describe the blending of up to 60 weight percent of intercalated clay materials with a wide range of polymers including polyamides, polyesters, polyurethanes, polycarbonates, polyolefins, vinyl polymers, thermosetting resins and the like. Such high loadings with modified clays are impractical and useless with most polymers because the melt viscosity of the blends increases so much that they cannot be molded.

WO 93/04117 discloses a wide range of polymers melt blended with up to 60 weight percent of dispersed platelet particles. WO 93/04118 discloses nanocomposite materials of a melt processable polymer and up to 60 weight percent of a clay that is intercalated with organic onium salts. The use of a mixture of swellable layered clays or a clay mixture intercalated with an onium ion is not contemplated nor disclosed.

U.S. Pat. No. 5,552,469 describes the preparation of intercalates derived from certain clays and water soluble polymers such as polyvinyl pyrrolidone, polyvinyl alcohol, and polyacrylic acid. The use of clay mixtures or mixtures intercalated with onium ions is specifically excluded.

JP Kokai patent no. 9-176461 discloses polyester bottles wherein the polyester contains unmodified sodium montmorillonite. Incorporation of the clay into the polyester by melt compounding is disclosed; however the use of clay mixtures or clays intercalated with onium ions was neither contemplated nor disclosed.

Clays intercalated with a mixture of onium ions are used as rheology modifiers for certain coating applications; however, their use in polymer/clay nanocomposites has been neither contemplated nor disclosed. The following references are of interest with regard to chemically modified organoclay materials: U.S. Pat. Nos. 4,472,538; 4,546,126; 4,676,929; 4,739,007; 4,777,206; 4,810,734; 4,889,885; 4,894,411; 5,091,462; 5,102,948; 5,153,062; 5,164,440; 5,164,460; 5,248,720; 5,382,650; 5,385,776; 5,414,042; 5,552,469; WO Patent Application Nos. 93/04117; 93/04118; 93/11190; 94/11430; 95/06090; 95/14733; D. J. Greenland, J. Colloid Sci. 18, 647 (1963); Y. Sugahara et al., J. Ceramic Society of Japan 100, 413 (1992); P. B. Massersmith et al., J. Polymer Sci. Polymer Chem., 33, 1047 (1995); C. O. Sriakhi et al., J. Mater. Chem. 6, 103(1996).

Therefore, as shown above, a need exists for polymer nanocomposites having improved properties. This invention provides a novel polymer nanocomposite comprising a mixture of clay materials. This invention also provides articles produced from this polymer nanocomposite that have improved properties.

SUMMARY OF THE INVENTION

It has been discovered that a mixture of clays is useful for the preparation of a polymer/clay nanocomposite with sufficient exfoliation for improved properties and clarity for commercial applications, including film, bottles, and containers. The polymer nanocomposite materials of this invention are useful for forming articles or packages that have improved gas barrier properties over neat PET, for example. Containers made from these polymer composite materials are ideally suited for protecting consumable products, such as foodstuffs, soft drinks, and medicines.

This invention also seeks to provide a cost-effective method for producing nanocomposite compositions, and articles made therefrom, having sufficient barrier and clarity for wide spread applications as multilayer bottles and containers, including beer bottles. The polymer/clay nanocomposite composition and process of this invention are especially suited for use in applications requiring crystalline, molded or thermoformed parts.

In accordance with the purpose(s) of this invention, as embodied and broadly described herein, this invention, in one embodiment, relates to a polymer-clay nanocomposite comprising (i) a melt-processible matrix polymer, and incorporated therein (ii) a mixture of at least two swellable layered clay materials.

In another embodiment, this invention relates to a process for preparing a polymer-clay nanocomposite comprising (i) preparing a mixture of at least two swellable layered clay materials, and (ii) incorporating the mixture with a matrix polymer by melt processing the matrix polymer with the mixture.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific processes and conditions described, as specific processes and/or process conditions for processing polymer articles as such may, of course, vary. It is also understood that the terminology used herein is for the purpose of describing particular embodiments only and is not intended to be limiting.

It must also be noted that, as used in the specification and the appended claims, the singular forms "a," "an" and "the" included plural references unless the context clearly dictates otherwise.

Ranges may be expressed herein as from "about" or "approximately" one particular value and/or to "about" or "approximately" another particular value. When such a range is expressed, another embodiment includes from the one particular and/or to the other particular value. Similarly, when values are expressed as approximations, by use of the antecedent "about," it will be understood that the particular value forms another embodiment.

Definitions

Whenever used in this specification or claims, the terms set forth shall have the following meanings:

"Clay material," "layered clay" or "layered clay material" shall mean any organic or inorganic material or mixtures thereof, such as a smectite clay mineral, which is in the form of a plurality of adjacent, bound layers. The layered clay comprises platelet particles and is typically swellable.

"Platelet particles," "platelets" or "particles" shall mean individual or aggregate unbound layers of the layered clay material. These layers may be in the form of individual platelet particles, ordered or disordered small aggregates of platelet particles (tactoids), and small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate" shall mean a layered clay material that includes an intercalant disposed between adjacent platelet particles or tactoids of the layered material to increase the interlayer spacing between the adjacent platelets and tactoids. In this invention, the intercalant is preferably an organic cation and may also be a matrix polymer.

"Exfoliate" or "exfoliated" shall mean platelets dispersed predominantly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite(s)" or "nanocomposite composition(s)" shall mean a polymer or copolymer having dispersed therein a plurality of individual platelets obtained from an exfoliated, layered clay material.

"Matrix polymer" shall mean a thermoplastic or melt-processible polymer in which the platelet particles are dispersed to form a nanocomposite. In this invention, however, the platelet particles are predominantly exfoliated in the matrix polymer to form a nanocomposite.

Description of the Embodiments

The present invention relates to clay mixtures, polymer/clay nanocomposite compositions comprising clay mixtures, a process for preparing a polymer/clay nanocomposite, and to molded articles, films, fiber, etc. prepared from the polymer/clay nanocomposites of this invention. The process of this invention may be used to prepare a wide variety of polymer/clay nanocomposite compositions, the most preferred being polyester/clay nanocomposites.

Without being bound by any particular theory, it is believed that the degree of improved gas barrier (permeability) depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the platelet particles representative of the bulk of the composite be exfoliated, and preferably be highly exfoliated, in the matrix polymer such that the majority, preferably at least about 75 percent and perhaps as much as at least about 90 percent or more of the platelet particles, be dispersed in the form of individual platelets and small aggregates having a thickness in the shortest dimension of less than about 20 nm and preferably less than about 10 nm, as estimated from TEM images. Polymer-platelet nanocomposites containing more individual platelets and fewer aggregates, ordered or disordered, are most preferred.

Significant levels of incomplete dispersion (i.e., the presence of large agglomerates and tactoids greater than about 20 nm) not only lead to an exponential reduction in the potential barrier improvements attributable to the platelet particles, but also can lead to deleterious affects to other properties inherent to polymer resins such as strength, toughness, and heat resistance, and processability.

Again, without being bound by a particular theory, it is believed that delamination of platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which are accessible to a polymer chain when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing. Heretofore, efforts to achieve a favorable enthalpy of mixing of platelet particles with melt processible polymers by pretreating the platelet particles (e.g., by cation exchange with alkyl ammonium ions) have been unsuccessful.

The prior art has defined the degree of separation of platelet particles based on peak intensity and basal spacing value, or lack of predominant basal spacing, as determined by X-ray analyses of polymer-platelet composites. Even though X-ray analysis alone often does not unambiguously predict whether the platelet particles are individually dispersed in the polymer, it can often allow quantification of the level of dispersion achieved. Basal spacing by X-ray diffraction indicates the separation distance of a platelet in a tactoid rather than single platelets. X-ray diffraction intensity (basal spacing peak height) may correlate to barrier in an article resulting from a nanocomposite including a clay material mixture as described above. For example, a low basal spacing peak height indicates few tactoids; therefore, the remainder must be either individual platelets or tactoids that are disordered. Moreover, if one organoclay (a clay treated with an organic cation) that has a high basal spacing, as shown by X-ray, is mixed with another organoclay that has a low basal spacing, as shown by X-ray, two individual X-ray spacings are expected.

Moreover, in polymer nanocomposites, X-ray analysis alone does not accurately predict either the dispersion of the platelet particles in the polymer or the resultant gas barrier improvement. TEM images of polymer-platelet composites show that platelet particles which are incorporated into at least one polymer exist in a variety of forms, including, but not limited to, individual platelets (the exfoliated state), disordered agglomerates of platelets, well ordered or stacked aggregates of platelets (tactoids), swollen aggregates of stacked platelets (intercalated tactoids), and aggregates of tactoids.

It has been discovered that intimately mixing two individual clays, for example, does not produce the expected two individual X-ray spacings. Rather, only an intermediate X-ray basal spacing is observed when at least two different clay materials are intimately mixed. Intimate mixing of a clay blend (e.g., sodium montmorillonite and sodium Laponite RD) can be achieved by delaminating the stacked silicate layered structure of each clay or organoclay, usually from a solvent. The clay (silicate) layers may be recombined upon removal of the solvent to provide a uniform dispersion of silicate layers within the clay blend. Solvents useful for obtaining an intimate mixture of clays include, but are not limited to, water, alcohols (e.g., methanol), chlorinated solvents (e.g., methylene chloride), ketones (e.g., acetone), esters (e.g., ethyl acetate), and/or ethers (e.g., tetrahydrofuran or dioxane). After intimately mixing the clays, the solvents are removed, and as such, low boiling point solvents are preferred.

Without being bound by any particular theory, it is believed that intimately mixed clay mixtures are less ordered and are therefore more easily separated and delaminated into the preferred small tactoid and individual platelet structures. As such, the polymer/clay nanocomposites of this invention exhibit an unexpectedly lower gas permeability, particularly oxygen permeability, than clay-free polymers.

Therefore, regarding the present invention, it has been found that using a mixture of layered clay materials while melt processing with a polymer gives a good dispersion of platelet particles in a resulting nanocomposite, creating mostly individual platelet particles. The resulting nanocomposite has improved barrier to gas when formed into a wall or article compared to a neat polymer formed into the same or similar structure.

In one embodiment, this invention relates to a polymer nanocomposite comprising a melt-processible polymer and up to about 25 weight percent of a mixture of swellable layered clay materials, which may be intercalated with an organic cation, preferably an onium ion. The intercalated clay material mixture has platelet particles, which are dispersed in the polymer. The polymer nanocomposite is preferably a polyester polymer or copolymer nanocomposite having an I.V. of at least 0.5 dL/g as measured in 60 wt. %/40 wt. % phenol/tetrachloroethane at 25° C.

In another embodiment, a process for manufacturing the polymer nanocomposite of this invention comprises (1) preparing the layered clay material mixture and (2) incorporating the layered clay material mixture with a polymer by melt processing the polymer and the layered clay material mixture. Melt processing includes melt and extrusion compounding. Use of extrusion compounding to mix the clay mixture and the polymer presents advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin.

The nanocomposite composition of the present invention comprises less than about 25 weight percent, preferably from about 0.5 to about 20 weight percent, more preferably from about 0.5 to about 15 weight percent, and most preferably from about 0.5 to about 10 weight percent of clay mixtures. The amount of platelet particles is determined by measuring the amount of silicate residue in the ash of the polymer/platelet composition when treated in accordance with ASTM D5630-94.

Useful clay materials include natural, synthetic, and modified phyllosilicates. Natural clays include smectite clays, such as montmorillonite, hectorite, mica, vermiculite, bentonite, nontronite, beidellite, volkonskoite, saponite, magadite, kenyaite, and the like. Synthetic clays include synthetic mica, synthetic saponite, synthetic hectorite, and the like. Modified clays include fluoronated montmorillonite, fluoronated mica, and the like. Suitable clays are available from various companies including Nanocor, Inc., Southern Clay Products, Kunimine Industries, Ltd., and Rheox.

Generally, the layered clay materials useful in this invention are an agglomeration of individual platelet particles that are closely stacked together like cards, in domains called tactoids. The individual platelet particles of the clays preferably have thickness of less than about 2 nm and diameter in the range of about 10 to about 3000 nm. Preferably, the clays are dispersed in the polymer so that most of the clay material exists as individual platelet particles, small tactoids, and small aggregates of tactoids. Preferably, a majority of the tactoids and aggregates in the polymer/clay nanocomposites of the present invention will have thickness in its smallest dimension of less than about 20 nm. Polymer/clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 milliequivalents per gram of mineral (meq/g), preferably from about 0.9 to about 1.5 meq/g. The clay may have a wide variety of exchangeable cations present in the galleries between the layers of the clay, including, but not limited to, cations comprising the alkaline metals (group IA), the alkaline earth metals (group IIA), and their mixtures. The most preferred cation is sodium; however, any cation or combination of cations may be used provided that most of the cations may be exchanged for organic cations (onium ions). The exchange may occur by treating a individual clay for a mixture or a mixture of clays with organic cations.

Preferred clay materials, for at least one of the components of the clay mixture, are phyllosilicates of the 2:1 type having a cation exchange capacity of 0.5 to 2.0 meq/g. The most preferred clay materials, for at least one of the components of the clay mixture, are smectite clay minerals, particularly bentonite or montmorillonite, more particularly Wyoming-type sodium montmorillonite or Wyoming-type sodium bentonite.

Although any mixture of clays in any ratio and/or weight percentage is contemplated by this invention, preferred clay mixtures include mixtures in which at least one the clay components has an alkyl group containing at least 12 carbon atoms and the other clay component has an alkyl group containing less than 12 carbon atoms. Preferred mixtures would be a mixture of dodecyl ammonium montmorillonite with tetramethyl ammonium montmorillonite or dodecyl ammonium montmorillonite with sodium montmorillonite. The most preferred mixtures include mixtures in which at least one clay component has an alkyl group containing 18 carbons and the other component has an alkyl group containing less than 18 carbons. Most preferred mixtures would be mixtures of bis(2-hydroxyethyl) octadecyl methyl ammonium montmorillonite with dodecyl ammonium montmorillonite and octadecyl trimethyl ammonium montmorillonite with tetramethyl ammonium montmorillonite.

Further, the preferred ratios of the clay mixtures include any ratio from about 75/25 to about 25/75, and more preferably from about 60/40 to about 40/60. The preferred ratios apply to mixtures containing two clay materials. However, mixtures and ratios of mixtures of clay materials of more than two clays are also contemplated by this invention.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

The clay mixtures of this invention may comprise refined but unmodified clays, modified clays or mixtures of modified and unmodified clays. Many clay treatments used to modify the clay for the purpose of improving dispersion of clay materials are known and may be used in the practice of this invention. The clay treatments may be conducted prior to, during, or after mixing the clay materials. When the treatments are made prior to mixing, the modifications may be the same or different.

In another embodiment of this invention, an intercalated layered clay material mixture is prepared by the reaction of a swellable layered clay with an organic cation, preferably an ammonium compound (to effect partial or complete cation exchange). If desired, two or more organic cations may be used to treat a clay. Moreover, mixtures of organic cations may also be used to prepare an intercalated layered clay material, wherein the intercalated layered clay material in a polymer nanocomposite comprises a mixture of intercalated clays. The process to prepare the organoclays (intercalated clays) may be conducted in a batch, semi-batch, or continuous manner.

There is a good chance for different kinds of montmorillonite clays to mix their basic platelets from different tactoids in the clay dispersion, especially in water. Once the water is removed, or the tactoids are intercalated with onium ions (nanomers), the exfoliated platelets will collapse, or precipitate out of the onium ion-containing intercalating composition, forming new tactoids from the clay mixture. The tactoids in the mixed montmorillonite clays will be "inter-exchanged", which means that the clay tactoids will re-arrange to comprise individual layers in a tactoid and can: (1) introduce mismatched cation exchange capacities, (2) introduce mis-matched platelet particle sizes and (3) change the color of the individual base clays. The mismatching of charge density and dimensions of tactoid platelets will greatly help the Nanomer to exfoliate and remain dispersed in a matrix polymer.

Organic cations used to intercalate a clay material or a mixture of clay materials of a nanocomposite of this invention are derived from organic cation salts, preferably onium salt compounds. Organic cation salts useful for the nanocomposite and process of this invention may generally be represented by the following formula (I):

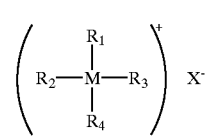

wherein M is either nitrogen or phosphorous; X⁻ is a halide, hydroxide, or acetate anion, preferably chloride and bromide; and $R_1$, $R_2$, $R_3$, and $R_4$ are independently organic and/or oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl. ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl)

ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to, alkyl ammonium ions such as dodecyl ammonium, octadecyl trimethyl ammonium, bis(2-hydroxyethyl) octadecyl methyl ammonium, octadecyl benzyl dimethyl ammonium, and the like or mixtures thereof.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units. The preferred organic cation for use in polyesters, such as polyethylene terephthalates, is a polyalkoxylated ammonium compound, preferably ETHOQUAD 18/25.

Numerous methods to modify layered clays with organic cations are known, and any of these may be used in the practice of this invention.

One embodiment of this invention is the modification of a layered clay with an organic cation salt by the process of dispersing a layered clay or mixture of clays into hot water, most preferably from 50 to 80° C., adding the organic cation salt separately or adding a mixture of the organic cation salts (neat or dissolved in water or alcohol) with agitation, then blending for a period of time sufficient for the organic cations to exchange most of the metal cations present in the galleries between the layers of the clay material(s). Then, the organically modified layered clay material(s) is isolated by methods known in the art including, but not limited to, filtration, centrifugation, spray drying, and their combinations.

It is desirable to use a sufficient amount of the organic cation salt(s) to permit exchange of most of the metal cations in the galleries of the layered particle for the organic cation(s); therefore, at least about 0.5 equivalent of total organic cation salts is used and up to about 3 equivalents of organic cation salts can be used. It is preferred that about 0.5 to 2 equivalents of organic cation salts be used, more preferably about 0.9 to 1.5 equivalents. It is desirable, but not required, to remove most of the metal cation salts and most of the excess organic cation salts by washing and other techniques known in the art.

Prior to incorporation into a polymer, the particle size of the clay material is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

The clay mixtures may be further treated for the purposes of aiding exfoliation in the composite and/or improving the strength of the polymer/clay interface. Any treatment that achieves the above goals may be used. Examples of useful treatments include intercalation with water-soluble or water-insoluble polymers, organic reagents or monomers, silane compounds, metals or organometallics, and/or their combinations. Treatment of the clay can be accomplished prior to the addition of a polymer to the clay material mixture, during the dispersion of the clay mixture with a polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the clay mixtures include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

If desired, a dispersing aid may be present during or prior to the formation of the composite by melt mixing for the purposes of aiding exfoliation of the treated or untreated swellable layered particles into the polymer. Many such dispersing aids are known, covering a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 8 times the amount of the platelet particles.

Any melt-processible polymer or oligomer may be used in this invention. Illustrative of melt-processible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the preferred polymers are linear or nearly linear, polymers with other architectures, including branched, star, cross-linked and dendritic structures, may be used if desired.

The preferred polymers include those materials that are suitable for use in the formation of multilayer structures with polyesters, and include polyesters (such as poly(ethylene terephthalate)), polyamides (such as poly(m-xylylene adipamide)), polyethylene-co-vinyl alcohols (such as EVOH), and similar or related polymers and/or copolymers. The most preferred polyester is poly(ethylene terephthalate) and/or its copolymers. The most preferred polyamide is poly(m-xylylene adipamide) and/or its copolymers.

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The preferred polyester is poly(ethylene terephthalate) (PET) or a copolymer thereof. The polyester may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, naphthalene- 2,6-dicarboxylic acid, cyclohexanedicarboxylic acid, cyclohexanediacetic acid, diphenyl-4,4'-dicarboxylic acid, phenylene (oxyacetic acid) succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, and more preferably up to about 15 mole percent of one or more different diols. Such additional diols include cycloaliphatic diols preferably having 3 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- orpara-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly (hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminononanoic acid (nylon 9), polyundecaneamide (nylon 11), polyaurylactam (nylon 12), poly (ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

The most preferred polyamides include poly(m-xylylene adipamide), polycapramide (nylon 6) and polyhexamethylene-adipamide (nylon 6,6). Poly(m-xylylene adipamide) is a preferred polyamide due to its availability, high barrier, and processability.

The polyamides are generally prepared by processes that are well known in the art.

Although not necessarily preferred, the polymers of the present invention may also include additives normally used in polymers. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

This invention also relates to monolayer and multilayer articles prepared from the nanocomposite material of this invention, including, but not limited to, film, sheet, pipes, tubes, profiles, molded articles, preforms, stretch blow molded films and containers, injection blow molded containers, extrusion blow molded films and containers, thermoformed articles and the like. The containers are preferably bottles.

The bottles and containers of this invention provide increased shelf storage life for contents, including beverages and food that are sensitive to the permeation of gases. Articles, more preferably containers, of the present invention often display a gas transmission or permeability rate (oxygen, carbon dioxide, water vapor) of at least 10% lower (depending on clay concentration) than that of similar containers made from clay-free polymer, resulting in correspondingly longer product shelf life provided by the container. Desirable values for the sidewall modulus and tensile strength may also be maintained.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment of this invention, the polymer-clay nanocomposite and the molded article or extruded sheet may be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay mixture to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the nanocomposite layer being sandwiched between two outer polymer layers, the surface roughness is often considerably less than for a monolayer nanocomposite material. Thus, with a multilayer approach, the level of haze is reduced.

EXAMPLES

The following examples are put forth to further illustrate this invention and so as to provide those of ordinary skill in the art with a more complete disclosure and description of how the nanocomposite compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pre ssure is at or near atmospheric.

Eample 1

This example illustrates a method for preparing a blend of organoclays fabricated from different clays but containing the same alkylammonium tether.

Sodium montmorillonite (7.50 grams, 7.12 milliequivalents) supplied by Southern Clay Products and reported to have a cation exchange capacity of 95 milliequivalents/100 grams and Laponite RD (2.5 grams, 1.37 milliequivalents) were mixed in 490 ml of water at 60° C. in a Vitamix blender to form a 2% by weight slurry of clay in water. Octadecyltrimethylammonium chloride (5.9 grams, 8.49 milliequivalents), commercially available as a 50% solution in isopropanol as ARQUAD 18/50, was dissolved in 25 ml of water then added to the Vitamix blender containing the clay suspension. This mixture was blended at high speed for one minute and the solids formed were removed by filtration on a Buchner funnel. The product was reslurried in 250 ml of water in a Vitamix blender, filtered again, and dried in a circulating air oven at 60° C. for 16 hours. The product exhibited a basal spacing by X-ray diffraction of 1.86 nanometers.

Example 2

This example illustrates a method for blending two organoclays in solvents and the melt compounding of this blend into PET.

Octadecyl methyl di(2-hydroxyethyl)ammonium montmorillonite (20.7 grams) and dodecylammonium montmorillonite (19.2 grams) were suspended in 1000 ml of a solution of 85 wt % toluene and 15 wt % methanol. The mixture was thoroughly blended with an Ultra Turrax T50 blender. The solvent was evaporated from the mixture and the solid remaining was dried in an oven at 60° C. for 24 hours. The product exhibited a basal spacing by X-ray diffraction of 1.5 nanometers.

Polyethylene terephthalate (375 grams) (or PET 9921 of Eastman Chemical Company) was dry blended with the mixed organoclays (25 grams) described above and the blend dried in a vacuum oven at 110° C. for 16 hours. The blend was extruded on a Leistritz Micro- 18 double screw extruder at 275° C. and 200 rpm. The molten strand was quenched in chilled water and pelletized. The polyester composite had an inherent viscosity of 0.56 dl/g and an ash content of 4.5 wt %.

The pellets are dried at 115° C. in a vacuum oven for about 16 hours then compression molded into about 10 mil film by pressing the sample between layers of polyimide film at 285° C. The oxygen permeability of the polyester/ composite is then determined by correcting for the permeability of the polyimide film and converting to a one-mil basis using conventional calculations. The oxygen permeability rate is 5.48 cc-mil/100 in$^2$-24 hour-atmosphere.

A film of poly(ethylene terephthalate) molded under conditions similar to those used above has an oxygen permeability of 14.0 cc-mil/100 in$^2$-24 hour-atmosphere.

Example 3

This example illustrates a method for blending an organoclay and sodium montmorillonite in solvents and the melt compounding of this blend into PET.

Octadecyl methyl di(2-hydroxyethyl)ammonium montmorillonite (39.9 grams) and sodium montmorillonite (20 grams) were suspended in 1000 ml of a solution of 85 wt % toluene and 15 wt % methanol. The mixture was thoroughly blended with an Ultra Turrax T50 blender. The solvent was evaporated from the mixture and the solid remaining was dried in an oven at 60° C. for 24 hours. The product exhibited a basal spacing by X-ray diffraction of 1.4 nanometers.

Polyethylene terephthalate (375 grams) (or PET 9921 of Eastman Chemical Company) was dry blended with the mixed clays (25 grams) described above and the blend dried in a vacuum oven at 110° C. for 16 hours. The blend was extruded on a Leistritz Micro-18 double screw extruder at 275° C. and 200 rpm. The molten strand was quenched in chilled water and pelletized. The polyester composite had an inherent viscosity of 0.57 dl/g and an ash content of 4.8 wt %.

The pellets are dried at 115° C. in a vacuum oven for about 16 hours then compression molded into about 10 mil film by pressing the sample between layers of polyimide film at 285° C. The oxygen permeability of the polyester/composite is then determined by correcting for the permeability of the polyimide film and converting to a one-mil basis using conventional calculations. The oxygen permeability rate is 5.76 cc-mil/100 in$^2$-24 hour-atmosphere.

Example 4

This example illustrates a method for blending an organoclay and the synthetic clay Laponite RD in solvents and the melt compounding of this blend into PET.

Octadecyl methyl di(2-hydroxyethyl)ammonium montmorillonite (39.9 grams) and Laponite RD (20 grams) were suspended in 1000 ml of a solution of 85 wt % toluene and 15 wt % methanol. The mixture was thoroughly blended with an Ultra Turrax T50 blender. The solvent was evaporated from the mixture and the solid remaining was dried in an oven at 60° C. for 24 hours. The product exhibited a basal spacing by X-ray diffraction of 1.4 nanometers.

Polyethylene terephthalate (375 grams) (or PET 9921 of Eastman Chemical Company) was dry blended with the mixed clays (25 grams) described above and the blend dried in a vacuum oven at 110° C. for 16 hours. The blend was extruded on a Leistritz Micro-18 double screw extruder at 275° C. and 200 rpm. The molten strand was quenched in chilled water and pelletized. The polyester composite had an inherent viscosity of 0.63 dl/g and an ash content of 4.1 wt %.

The pellets are dried at 115° C. in a vacuum oven for about 16 hours then compression molded into about 10 mil film by pressing the sample between layers of polyimide film at 285° C. The oxygen permeability of the polyester/composite is then determined by correcting for the permeability of the polyimide film and converting to a one-mil basis using conventional calculations. The oxygen permeability rate is 5.52 cc-mil/100 in$^2$-24 hour-atmosphere.

Example 5

The procedure of Example 1 was repeated using different weight percent combinations of sodium montmorillonite and Laponite RD. Sodium montmorillonite and Laponite RD were also tested individually. The results are shown in Table 1.

The resulting clay mixtures, as shown in Table 1, display X-ray diffraction basal spacings that are intermediate between that of the two clays individually. Intermediate basal spacings indicate that intimate mixing was achieved in the mixture and also indicates a transformation of the order of the clay materials from two basal spacings to one intermediate basal spacing. In other words, the spacing of each individual organoclay has been disordered from one basal spacing order to another.

TABLE 1

| Weight Ratio of sodium montmorillonite to Laponite RD | X-ray Basal Spacing (nm) |
| --- | --- |
| 100:0 | 2.0 |
| 75:25 | 1.86 |
| 50:50 | 1.78 |
| 25:75 | 1.49 |
| 0:100 | 1.43 |

Example 6

This example demonstrates the formation of onium ion-intercalated clay with mixed montmorillonite clays. Nanocor, Inc. provides several kinds of Na-montmorillonite clays. These clays originate from different geographic locations. For example, one Na-montmorillonite is called Na-CWC, which has a cation exchange capacity of about 1.4 meq per gram. Another Na-montmorillonite, called Na-Belle Yellow (Na-BY), has a cation exchange capacity of 1.2 meq per gram. Na-CWC and Na-BY also have different particle sizes and particle size distributions. Na-CWC is white-like, but with tint color when dispersed into water. Na-BY has yellow color in dry and slurry form. They are not preferred to use as a single clay source in the nanocomposite formation. However, the combination of Na-CWC and Na-BY will alter the color of the final clay. The CEC difference will allow the clay mixture to create a disordered and more easily dispersed system of platelets in a matrix polymer. They are good candidates for the formation of onium ion-exchanged clays. 50 g of Na-CWC and 50 g of Na-BY were slurried in 4000 goof distilled water, and mixed thoroughly and heated to 80–85° C. 0.13 moles of octadecylamine and 0.13 moles of HCl were added to 2000 g of water and heated to 80–85° C. The ODA solution was mixed with the mixed clay slurry. Onium ion-intercalated clay precipitated from the slurry upon mixing. The treated clay was filtered, washed, and dried according to procedures stated in the early text. X-ray diffraction XRD results of the ODA-CWC/BY (1:1) and ODA-CWC, and ODA-BY clays are given in the following table. The poor intensity and broad half-height weight indicated the onium ion-intercalated clays prepared with mixed montmorillonite clays had lower ordering than their analogues.

| Na-CWC to Na-BY (weight) | X-ray Basal Spacing (nm) | XRD d001 peak density and half height width |
| --- | --- | --- |
| 0:100 | 19.2 | Good intensity, narrow width |
| 50:50 | 20.3 | Poor intensity, broad width |
| 100:0 | 22.0 | Good intensity, narrow width |

The milled clay was compounded into PET to form a nanocomposite and the compounded nanocomposite showed improved color compared to the nanocomposite prepared from single CWC or BY clays. The nanocomposite demonstrated improved $O_2$ barrier properties compared with the PET-9921 (of Eastman Chemical) resin and nanocomposites prepared from single clays. The nanocomposites prepared from the mixed clays are suitable for use in PET contained applications, such as bottled water, beer and soft drinks, as well as for incorporation into all other polymers.

Comparative Example 1

Equal portions of octadecyltrimethylammonium-intercalated sodium montmorillonite and octadecylammonium-intercalated Laponite RD were dry mixed (in contrast to intimately mixed) and then evaluated by X-ray diffraction, which showed two basal spacings of 1.86 nm and 1.34 nm. These spacings are about the same as that of the individual clay materials, indicating that the order within each of the clay tactoids is preserved.

In other words, the dry mixed clay mixture did not transform the order from two basal spacings to one intermediate basal spacing. This lack of order transformation may result in less dispersion when the clay mixture is intercalated with a matrix polymer to form a polymer-clay nanocomposite.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer-clay nanocomposite comprising:
   (i) a melt-processible matrix polymer, and incorporated therein
   (ii) an intimate mixture of at least two swellable smectite layered clay materials, wherein said nanocomposite comprising greater than zero to about 25 weight percent of layered clay material.

2. The nanocomposite of claim 1 comprising from about 0.5 to about 15 weight percent of layered clay material.

3. The nanocomposite of claim 1 comprising from about 0.5 to about 10 weight percent of layered clay material.

4. The nanocomposite of claim 1, wherein the melt-processible matrix polymer comprises a polyester, polyetherester polyamide, polyesteramide, polyurethane, polyimide, polyethermide, polyurea, polyamideimide, polyphenyleneoxide, phenoxy resin, epoxy resin, polyolefin, polyacrylate, polyseyrene, polyethylene-co-vinyl alcohol, or a copolymer thereof, or a mixture thereof.

5. The nanocomposite of claim 1, wherein the melt-processible matrix polymer comprises poly(m-xylylene adipamide), EVOH, or a copolymer thereof, or a mixture thereof.

6. The nanocomposite of claim 1, wherein the melt-processible matrix polymer comprises poly(ethylene terephthalate) or a copolymer thereof, or a mixture thereof.

7. The nanocomposite of claim 1, comprising from about 0.5 to about 15 weight percent of layered clay material.

8. The nanocomposite of claim 1, comprising from about 0.5 to about 10 weight percent of layered clay material.

9. The nanocomposite of claim 1, wherein the mixture of layered clay materials comprises natural, synthetic or modified phyllosilicates.

10. The nanocomposite of claim 1, wherein the mixture of layered clay materials comprises natural, synthetic or modified montmorillonites, saponites, hectorites, micas, vermiculites, bentonites, nontronites, beidellites, volkonskoites, magadites, kenyaites, or mixtures thereof.

11. The nanocomposite of claim 1, wherein the mixture of layered clay materials includes bis(2-hydroxyethyl) octadecyl methyl ammonium montmorillonite and dodecyl ammonium montmorillonite, octadecyl trimethyl ammonium montmorillonite and tetramethyl ammonium montmorillonite, dodecyl ammonium montmorillonite and tetramethyl ammonium monunonllonite, or dodecyl ammonium montmorillonite and sodium montmorillonite.

12. The nanocomposite of claim 1, wherein the layered clay materials are free flowing powders having a cation exchange capacity from about 0.9 to about 1.5 meq/g.

13. The nanocomposite of claim 1, wherein at least 50 percent of the layered clay materials are dispersed in the form of individual platelet particles and tactoids in the matrix polymer.

14. The nanocomposite of claim 13, wherein the tactoids have a thickness of less than about 20 nm.

15. The nanocomposite of claim 1, wherein the mixture of layered clay materials is intercalated with an organic cation or a mixture of organic cations.

16. The nanocomposite of claim 15, wherein the organic cation is represented by the formula (I):

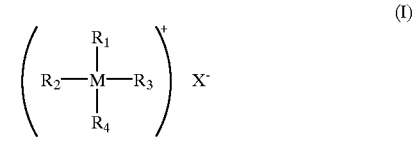

wherein M is either nitrogen or phosphorous; X is a halide, hydroxide, or acetate anion, preferably chloride and bromide; and $R_1$, $R_2$, $R_3$, and $R_4$ are independently organic and/or oligomeric ligands or may be hydrogen.

17. The nanocomposite of claim 15, wherein the organic cation is derived from an onium salt compound comprising an ammonium or phosphonium salt compound.

18. The nanocomposite of claim 15, wherein the organic cation comprises an alkyl ammonium ion, an alkyl phosphonium ion, a polyalkoxylated ammonium ion, or a mixture thereof.

19. The nanocomposite of claim 18, wherein the alkyl ammonium ion comprises tetramethyl ammonium, hexyl ammonium, butyl ammonium, bis(2-hydroxyethyl dimethyl ammonium, hexyl benzyl dimethyl ammonium, benzyl trimethyl ammonium, butyl benzyl dimethyl ammonium, tetrabutyl ammonium di(2-hyrdoxyethyl) ammonium, dodecyl ammonium, octadecyl ammonium, octadecyl trimethyl ammonium, bis(2-hydroxyethyl) octadecyl methyl ammonium, or octadecyl benzyl dimethyl ammonium.

20. The nanocomposite of claim 18, wherein the alkyl phosphonium ion comprises tetrabutyl phosphonium, trioctyl octadecyl phosphonium, tetraoctyl phosphonium, or octadecyl triphenyl phosphonium.

21. The nanocomposite of claim 18, wherein the polyalkoxylated ammonium ion is derived from a hydrochloride salt of oligooxylthylene amine with a number average molecular weight of about 1100 g/mol, a hydrochloride salt of oligooxypropylene amine with a number average molecular weight of about 640 g/mol, a hydrochloride salt of octadecyl bis(polyoxyethylene)amine or octadecyl bis (polyoxyethylene[15]) ammonium chloride, wherein the numbers in brackets are the total number of ethylene oxide units.

22. The nanocomposite of claim 18, wherein the alkyl ammonium ion comprises tetramethyl ammonium, hexyl ammonium, butyl ammonium, bis(2-hydroxyethyl dimethyl ammonium, hexyl benzyl dimethyl ammonium, benzyl trimethyl ammonium, butyl benzyl dimethyl ammonium, tetrabutyl ammonium di(2-hyrdoxyethyl) ammonium, dodecyl ammonium, octadecyl ammonium, octadecyl trimethyl ammonium, bis(2-hydroxyethyl) octadecyl methyl ammonium, or octadecyl benzyl dimethyl ammonium; and wherein the alkyl phosphonium ion comprises tetrabutyl phosphonium, trioctyl octadecyl phosphonium, tetraoctyl phosphonium, or octadecyl triphenyl phosphonium; wherein the polyalkoxylated ammonium ion is derived from a hydrochloride salt of oligooxyethylene amine with a number average molecular weight of about 1100 g/mol, a hydrochloride salt of oligooxypropylene amine with a number average molecular weight of about 640 g/mol, a hydrochloride salt of octadecyl bis(polyoxyethylene)amine or octadecyl methyl bis(polyoxyethylene) ammonium chloride, wherein the numbers in brackets are the total number of ethylene oxide units.

23. The nanocomposite of claim 18, wherein the organic cation comprises tetramethyl ammonium, octadecyl trimethyl ammonium or a mixture thereof.

24. The nanocomposite of claim 1, wherein the melt-processible matrix polymer comprises poly(ethylene terephthalate) or a copolymer thereof and the mixture of layered clay materials comprises dodecyl ammonium montmorillonite, Wyoming-type sodium montmorillonite, or synthetic phyllosilicates.

25. A polymer-clay nanocomposite comprising:
(i) a melt-processible matrix polymer, and incorporated therein
(ii) an intimate mixture of at least two swellable smectite layered clay materials, wherein said nanocomposite having an I.V. of at least 0.5 dL/g as measured in 60 wt. %/40 wt. % phenol/tetrachloroethane at 25° C.

26. An article prepared from a polymer-clay nanocomposite made by the process for preparing said polymer-clay nanocomposite comprising:
(i) preparing an intimate mixture of at least two swellable layered smectite clay materials; and
(ii) incorporating the intimate mixture with a matrix polymer by melt processing the matrix polymer with the mixture to form a polymer-clay nanocomposite.

27. The article of claim 26 in the form of film, sheet, perform, profile, an extruded article, a molded article or a molded container.

28. The article of claim 26 in the form of a bottle.

29. An article prepared from a polymer-clay nanocomposite comprising:
(i) a melt-processible matrix polymer, and incorporated therein
(ii) an intimate mixture of at least two swellable smectite layered clay martials.

30. The article of claim 29 in the form of film, sheet, perform, profile, an extruded article, a molded article or a molded container.

31. The article of claim 25 in the form of a bottle.

32. The article of claim 25, having a gas permeability which is at least 10 percent lower than that of an article formed from a clay-free polymer.

33. An article having a plurality of layers wherein at least one layer is formed from a polymer-clay nanocomposite comprising:
(i) a melt-processible matrix polymer, and incorporated therein
(ii) an intimate mixture of at least two swellable smectite layered clay materials.

34. The article of claim 33, wherein the nanocomposite is disposed intermediate to two other layers.

35. The article of claim 33, having one or more layers of a structural polymer.

36. A process for preparing a polymer-clay nanocomposite comprising:
(i) preparing a mixture of at least two swellable layered clay materials; and
(ii) incorporating the mixture with a matrix polymer by melt processing the matrix polymer with the mixture to form a polymer-clay nanocomposite, wherein said nanocomposite comprising greater than zero to about 25 weight percent of layered clay material.

37. The process of claim 36, wherein step (i) is conducted by intimately mixing at least two swellable layered clay materials in a solvent.

38. The process of claim 37, wherein the solvent is water, an alcohol, a chlorinated solvent, a ketone, an ester, an ether or a mixture thereof.

39. The process of claim 36, wherein step (ii) is conducted by a melt compounding extrusion process.

* * * * *